United States Patent
Stauffer et al.

(10) Patent No.: US 11,013,041 B2
(45) Date of Patent: May 18, 2021

(54) 5G NR ENHANCED PHYSICAL DOWNLINK CONTROL CHANNEL

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

(*) Notice: Subject to any disclaimer, the term of this patent is extended or adjusted under 35 U.S.C. 154(b) by 162 days.

(21) Appl. No.: 16/027,183

(22) Filed: Jul. 3, 2018

(65) Prior Publication Data

US 2020/0015287 A1 Jan. 9, 2020

(51) Int. Cl.
*H04W 72/10* (2009.01)
*H04W 72/04* (2009.01)
*H04W 72/12* (2009.01)
*H04L 5/00* (2006.01)
*H04W 76/10* (2018.01)
*H04W 76/27* (2018.01)

(52) U.S. Cl.
CPC .......... *H04W 76/10* (2018.02); *H04L 5/0007* (2013.01); *H04L 5/0048* (2013.01); *H04W 72/042* (2013.01); *H04W 72/12* (2013.01); *H04W 76/27* (2018.02)

(58) Field of Classification Search
CPC . H04L 12/4633; H04L 45/745; H04L 5/0048; H04L 5/0007; H04W 76/10; H04W 72/042; H04W 72/12
USPC .................................................. 370/392, 330
See application file for complete search history.

(56) References Cited

U.S. PATENT DOCUMENTS

| 9,386,566 | B2 | 7/2016 | Turtinen et al. |
| 10,111,216 | B2 | 10/2018 | Chen et al. |
| 2013/0286960 | A1 | 10/2013 | Li et al. |

(Continued)

FOREIGN PATENT DOCUMENTS

| WO | 2014168656 | 10/2014 |
| WO | 2016119882 | 8/2016 |

(Continued)

OTHER PUBLICATIONS

"General Design Principles", 3GPP TSG RAN WG1 Meeting #82bis, Malmo, Sweden, Oct. 5-9, 2015, Oct. 2015, 5 pages.

(Continued)

*Primary Examiner* — Paul H Masur
*Assistant Examiner* — Ellen A Kirillova
(74) *Attorney, Agent, or Firm* — Colby Nipper

(57) ABSTRACT

This document describes techniques and apparatuses for a Fifth Generation New Radio (5G NR) enhanced Physical Downlink Control Channel (PDCCH). These techniques include a user device transmitting a request to a base station for a UE-specific PDCCH format. In aspects, the user device transmits an uplink Radio Resource Control (RRC) message or a Medium Access Control (MAC) Control Element (CE). The base station can then grant the user device a particular PDCCH format, based on the request, by using downlink RRC messages or a MAC CE. This allows the user device to identify the UE-specific PDCCH format and an appropriate aggregation level with which to decode messages on the PDCCH. These techniques reduce the amount of power consumed when decoding the messages on PDCCH in comparison to conventional techniques that rely on blind decoding.

20 Claims, 5 Drawing Sheets

(56) References Cited

U.S. PATENT DOCUMENTS

| | | | |
|---|---|---|---|
| 2015/0110059 A1 | 4/2015 | Bai et al. | |
| 2017/0171841 A1 | 6/2017 | Chen et al. | |
| 2017/0339681 A1 | 11/2017 | Hussain et al. | |
| 2018/0054284 A1* | 2/2018 | Froberg Olsson | .... H04L 5/0044 |
| 2018/0160410 A1 | 6/2018 | Xia et al. | |
| 2018/0279267 A1* | 9/2018 | Yasukawa | ........... H04W 72/042 |
| 2019/0274032 A1* | 9/2019 | Chatterjee | ............. H04W 48/12 |

FOREIGN PATENT DOCUMENTS

| | | | |
|---|---|---|---|
| WO | WO-2017095470 A1 * | 6/2017 | ........... H04L 5/0023 |
| WO | 2017127126 | 7/2017 | |
| WO | 2018082575 | 5/2018 | |

OTHER PUBLICATIONS

"International Search Report and Written Opinion", PCT Application No. PCT/US2019/040407, dated Oct. 15, 2019, 16 pages.

"PDCCH Capacity Analysis and Design Principles for Enhanced PDCCH", 3GPP TSg RAN WG1 Meeting #66bis, Zhuhai, China, Oct. 10-14, 2011, Oct. 2011, 6 pages.

"International Preliminary Report on Patentability", Application No. PCT/US2019/040407, dated Jan. 5, 2021, 9 pages.

* cited by examiner

5G NR ENHANCED PHYSICAL DOWNLINK CONTROL CHANNEL

BACKGROUND

Generally, a provider of a wireless network manages wireless communications over the wireless network. For example, a base station manages a wireless connection with a user device that is connected to the wireless network. The base station determines configurations for the wireless connection, such as bandwidth, timing, and protocol for the wireless connection. The base station then transmits control messages to the user device to instruct the user device of the configurations for the wireless connection. Allowing the base station to determine the configurations for the wireless connection allows the base station to manage wireless connections with many wireless devices. However, without information related to conditions at the user device, the base station may choose suboptimal configurations for the wireless connection between the base station and the user device.

With recent advances in wireless communication technology, providers also have access to higher-frequency radio spectrum, relative to conventional wireless deployments. This access coupled with other technologies enables the base station to provide wireless connections with wider bandwidth, lower latency, and increased data rates. With suboptimal configurations, however, these wireless connections with wider bandwidths and at higher frequency bands may cause user equipment to consume excessive power relative to conventional wireless deployments.

SUMMARY

This document describes techniques and apparatuses for a Fifth Generation New Radio (5G NR) enhanced Physical Downlink Control Channel (PDCCH). These techniques include a user device transmitting a request to a base station for a UE-specific PDCCH format. In aspects, the user device transmits an uplink Radio Resource Control (RRC) message or a Medium Access Control (MAC) Control Element (CE). The base station can then grant the user device a particular PDCCH format, based on the request, by using downlink RRC messages or a MAC CE. This allows the user device to identify the UE-specific PDCCH format and an appropriate aggregation level with which to decode messages on the PDCCH. These techniques reduce the amount of power consumed when decoding the messages on PDCCH in comparison to conventional techniques that rely on blind decoding.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of a 5G NR enhanced PDCCH is described below. The use of the same reference numbers in different instances in the description and the figures indicate similar elements.

DETAILED DESCRIPTION

Figure 1:
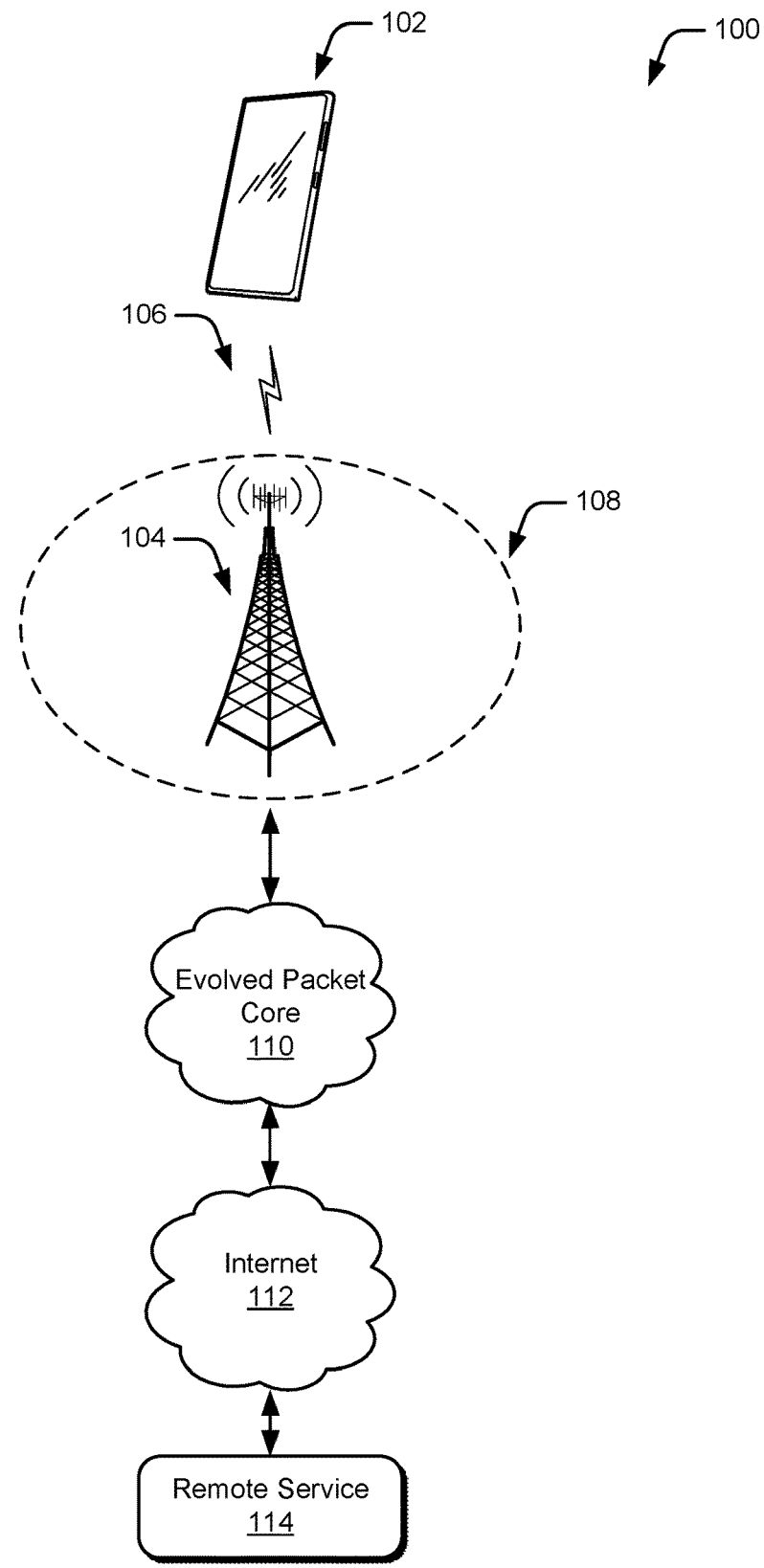
FIG. 1 illustrates an example operating environment in which a 5G NR enhanced PDCCH can be implemented.

Base stations of wireless networks manage wireless connections with user equipment (UE) devices by scheduling communication resources and determining configurations by which the user devices communicate. Base stations use a physical channel, such as Physical Downlink Control Channel (PDCCH), to transmit downlink control information (DCI) to user devices. The PDCCH carries information including scheduling assignments and other control information. Generally, a PDCCH is transmitted on an aggregation of one or more consecutive control channel elements (CCEs), where each CCE includes a plurality of resource element groups.

However, almost no information is provided to the user device for decoding a PDCCH payload. For example, the user device is typically not aware of the detailed control channel structure, including the number of control channels and the number of CCEs to which each control channel is mapped. Consequently, the user device generally performs "blind decoding," which involves monitoring an entire set of PDCCH candidates (e.g., a set of consecutive CCEs on which a PDCCH could be mapped) in every downlink subframe received from the base station. In an example, a single subframe can include multiple PDCCHs, and some of the PDCCHs may not be relevant to a particular user device. To find the PDCCH specific to the user device, a significant number of attempts may be required by the user device to successfully decode the PDCCH candidates. The user device can use its Radio Network Temporary Identifier (RNTI) to attempt to decode the PDCCH candidates. Generally, the RNTI is used to demask a PDCCH candidate's Cyclical Redundancy Check (CRC), and if no CRC error is detected, then the user device determines that the PDCCH carries control information specific to the user device. Inefficiencies exist, however, in attempting to decode signals that may not be relevant to the user device, which results in excessive power consumption.

This document describes techniques and systems for a 5G NR enhanced PDCCH. These techniques include a user device requesting a particular PDCCH format to reduce the amount of blind decoding that is generally performed by the user device on the PDCCH when using conventional techniques. In aspects, the user device transmits a Radio Resource Control (RRC) message or a Medium Access Control (MAC) Control Element (CE). The base station can then grant the user device a particular PDCCH format, based on the request, by using downlink RRC messages or a MAC CE. This allows the user device to identify the particular PDCCH format and an appropriate aggregation level with which to decode the PDCCH. Further, the user device can avoid blind decoding and therefore reduce the amount of power consumed through decoding the PDCCH.

This summary is provided to introduce simplified concepts of a 5G NR enhanced PDCCH. The simplified concepts are further described below in the Detailed Description. This summary is not intended to identify essential features of the claimed subject matter, nor is it intended for use in determining the scope of the claimed subject matter.

Operating Environment

FIG. 1 illustrates an example environment 100, which includes a user equipment 102 that communicates with a base station 104 that acts as a serving cell, (serving cell base station 104), through a wireless communication link 106 (wireless link 106). In this example, the user equipment 102 is implemented as a smartphone. Although illustrated as a smartphone, the user equipment 102 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 104 may be implemented as or include an Evolved Universal Terrestrial Radio Access Network (E-UTRAN), evolved Node B (eNodeB or eNB), a Next Generation Node B (gNodeB or gNB), a long-term evolution (LTE) system, an LTE-Advanced (LTE-A) system, an evolution of the LTE-A system, a 5G NR system, and the like. When implemented as part of a wireless network, the base station 104 may be configured to provide or support a macrocell, microcell, small cell, picocell, wide-area network, or any combination thereof. In various aspects of 5G NR enhanced PDCCH, the base station 104 may be referred to as an eNB, a gNB, or relay (or vice versa).

The serving cell base station 104 communicates with the user equipment 102 via the wireless link 106, which may be implemented as any suitable type of wireless link. The wireless link 106 can include a downlink of data and control information communicated from the serving cell base station 104 to the user equipment 102 and/or an uplink of other data and control information communicated from the user equipment 102 to the serving cell base station 104. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth.

The serving cell base station 104 may be part of a Radio Access Network 108 (RAN 108, Evolved Universal Terrestrial Radio Access Network 108, E-UTRAN 108), which is connected via an Evolved Packet Core 110 (EPC 110) network to form a wireless operator network. The UE 102 may connect, via the EPC 110, to public networks, such as the Internet 112 to interact with a remote service 114.

Figure 2:
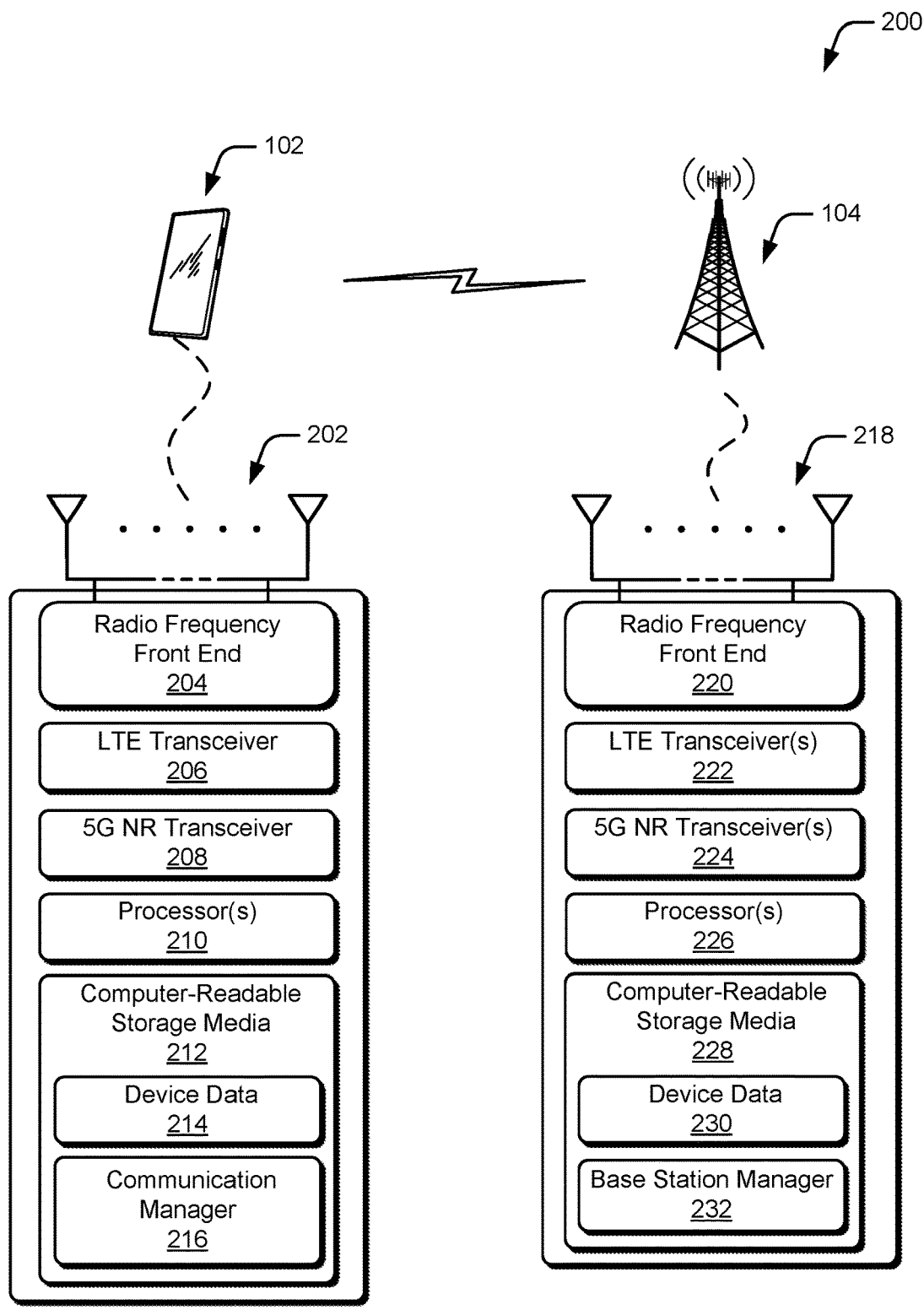
FIG. 2 illustrates an example device diagram of a user equipment and a serving cell base station.

FIG. 2 illustrates an example device diagram 200 of the user equipment 102 and the serving cell base station 104. It should be noted that not all features of the user equipment 102 and the serving cell base station 104 are illustrated here for the sake of clarity. In other words, the user equipment 102 and/or serving base station 104 may also include any other suitable components to implement respective communication or processing functions of either device. In this example, the user equipment 102 includes antennas 202, a radio frequency front end 204 (RF front end 204), an LTE transceiver 206, and a 5G NR transceiver 208 for communicating with base stations 104 in the E-UTRAN 108. The RF front end 204 of the user equipment 102 can couple or connect the LTE transceiver 206, and the 5G NR transceiver 208 to the antennas 202 to facilitate various types or modes of wireless communication. The LTE transceiver 206 and the 5G NR transceiver 208 are examples of a radio frequency transceiver.

The antennas 202 of the user equipment 102 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. By way of example and not limitation, the antennas 202 and the RF front end 204 can be implemented for operation in sub-gigahertz bands, sub-6 GH bands, and/or above 6 GHz bands that are defined by the 3GPP LTE and 5G NR communication standards. Alternatively, the 5G NR transceiver 208 may be replaced with a 5G NR receiver (or transmitter) and operations describe herein as performed by the 5G NR transceiver 208 may performed by the 5G NR receiver (or transmitter).

The user equipment 102 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals or carrier waves. The CRM 212 may include any suitable memory or storage device such as subscriber identity module (SIM), random-access memory (RAM), static RAM (SRAM), dynamic RAM (DRAM), non-volatile RAM (NVRAM), read-only memory (ROM), Flash memory, hard disk, or optical data storage device useful to store device data 214 of the user equipment 102. The device data 214 includes user data, multimedia data, applications, and/or an operating system of the user equipment 102, which are executable by processor(s) 210 to enable user interaction with the user equipment 102 or functionalities thereof.

CRM 212 also includes a communication manager 216, which, in one implementation, is embodied on CRM 212 (as shown). Alternately or additionally, the communication manager 216 may be implemented in whole or part as hardware logic or circuitry integrated with or separate from other components of the user equipment 102. In at least some aspects, the communication manager 216 configures or acts via the RF front end 204, the LTE transceiver 206, and/or the 5G NR transceiver 208 to implement the techniques for 5G NR enhanced PDCCH.

The device diagram for the serving cell base station 104 shown in FIG. 2 includes a single network node (e.g., an E-UTRAN Node B or gNodeB). The functionality of the serving cell base station 104 may be distributed across multiple network nodes and/or devices, and can be distributed in any fashion suitable to perform the functions described herein. In this example, the serving cell base station 104 includes antennas 218, a radio frequency front end 220 (RF front end 220), one or more LTE transceivers 222, and/or one or more 5G NR transceivers 224 for communicating with the user equipment 102. The RF front end 220 of the serving cell base station 104 can couple or connect the LTE transceivers 222 and the 5G NR transceivers 224 to the antennas 218 to facilitate various types of wireless communication.

The antennas 218 of the serving cell base station 104 may include an array of multiple antennas that are configured similar to or differently from each other. The antennas 218 and the RF front end 220 can be tuned to, and/or be tunable to, one or more frequency band defined by the 3GPP LTE and 5G NR communication standards, and implemented by the LTE transceivers 222, and/or the 5G NR transceivers 224. Additionally, the antennas 218, the RF front end 220, the LTE transceivers 222, and/or the 5G NR transceivers 224 may be configured to support beamforming, such as massive multiple input multiple output (mMIMO), for the transmission and reception of communications with the user equipment 102.

The serving cell base station 104 also includes processor(s) 226 and computer-readable storage media 228 (CRM 228). The processor 226 may be a single core processor or a multiple core processor composed of a variety of materials, such as silicon, polysilicon, high-K dielectric, copper, and so on. The CRM 228 may include any suitable memory or storage device such as random-access memory (RAM), static RAM (SRAM), dynamic RAM (DRAM), non-volatile RAM (NVRAM), read-only memory (ROM), or Flash memory useful to store device data 230 of the serving cell base station 104. The CRM 228 of the serving cell base station 104 is not configured to store propagating signals or carrier waves. The device data 230 includes network scheduling data, radio resource management data, applications, and/or an operating system of the serving cell base station 104, which are executable by processor(s) 226 to enable communication with the user equipment 102 or functionalities of the serving cell base station 104.

CRM 228 also includes a base station manager 232, which, in one implementation, is embodied on CRM 228 (as shown). Alternately or additionally, the base station manager 232 may be implemented in whole or part as hardware logic or circuitry integrated with or separate from other components of the serving cell base station 104. In at least some aspects, the base station manager 232 configures the LTE transceivers 222 and the 5G NR transceivers 224 for communication with the user equipment 102, as well as communication with the EPC 110.

Example Procedures

Example methods 300 and 400 are described with reference to FIGS. 3 and 4, respectively, in accordance with one or more aspects of a 5G NR enhanced PDCCH. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-particular Integrated Circuits (ASICs), Application-particular Standard Products (ASSPs), System-on-a-chip systems (SoCs), Complex Programmable Logic Devices (CPLDs), and the like.

Figure 3:
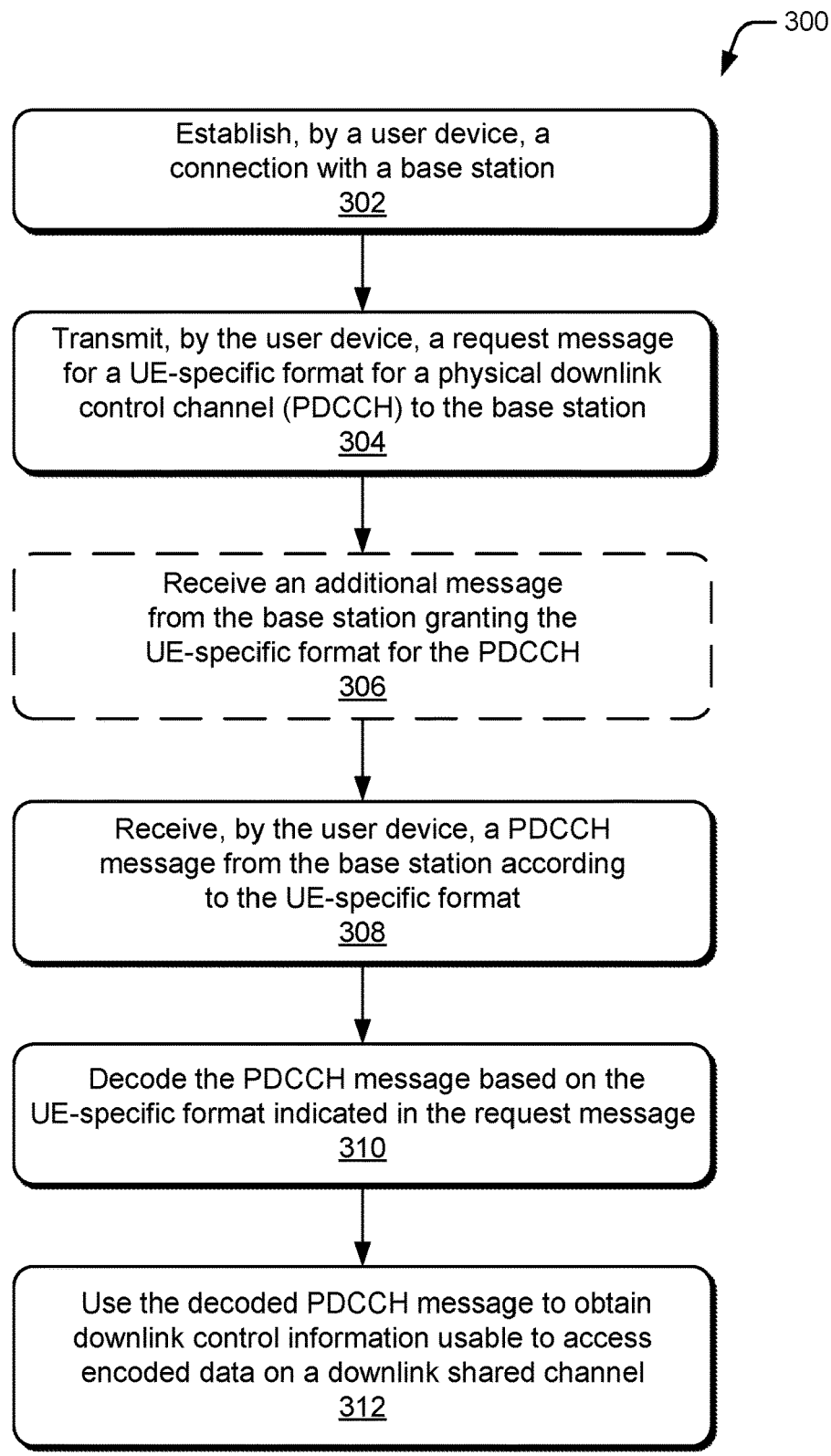
FIG. 3 depicts an example method of communicating, by a user device, with a base station in accordance with aspects of the techniques described herein.

FIG. 3 depicts an example method 300 of communicating, by a user device, with a base station in accordance with aspects of the techniques described herein. The order in which the method blocks are described are not intended to be construed as a limitation, and any number of the described method blocks can be combined in any order to implement a method, or an alternate method.

At 302, a user device establishes a connection with a base station. For example, the user equipment 102 can establish a connection with the base station 104 via the wireless link 106. Establishing a connection may include a processor (e.g., processor 210) executing code or instructions stored in a computer-readable storage media 212 (e.g., executing the communication manager 216 code and the device data 214 code stored in the CRM 212).

At 304, the user device transmits a request message for a particular format for a physical downlink control channel (PDCCH) to the base station. In aspects, the user equipment 102 transmits the request message as an uplink RRC message, a MAC CE, a Scheduled UpLink (SUL), or an LTE uplink. The request message can include a variety of information, such as a particular demodulation reference signal (DMRS) density, a modulation order, and/or an aggregation level. The request message can request a particular orthogonal frequency division multiplexing (OFDM) symbol index within a subframe that is to be used to carry the PDCCH. This allows the user device to select a specific symbol for the subframe to carry the PDCCH. In addition, the request message may include a preference for a frequency bandwidth for the PDCCH.

In at least some aspects, the request message includes a request for particular cross-carrier scheduling mapping, when multiple carriers are involved in the connection. This provides flexibility to the user device to indicate a preference for the mapping. In one example, the user device may monitor only a specific carrier that has low power operation compared to other carriers with relatively high power operation. There may be a preference for particular carriers with lower interference than others. In another example, the user device can indicate a preference for a lower frequency bandwidth based on signal quality. In addition, if the user device does not receive a PDCCH grant on a particular carrier, the grant for that carrier can be carried by one or more other carriers. Accordingly, some carriers can perform cross-carrier scheduling for the user device on other carriers.

In another example, the request message includes a request for PDCCH presence in only a particular Radio Access Technology (RAT) when multiple RATs are available, such as in an LTE-NR dual connectivity system. Cross-RAT scheduling may be requested if the PDCCH is only present in one of the LTE or NR networks Additionally, the request may include a request for PDCCH presence in a UE-defined subset of activated carriers and not in one or more ones of the other activated carriers. In this way, the user device may identify which of the activated carriers may, and which of the activated carriers may not, be part of the connection.

Optionally, at 306, the user device receives an additional message from the base station confirming the request message for the particular format for the PDCCH. For example, the user equipment 102 can receive a message from the base station 104 that grants the UE-specific format. In aspects the additional message can be received via a downlink RRC message, a MAC CE, a scheduled downlink, or an LTE downlink.

At 308, the user device receives a PDCCH message from the base station according to the UE-specific format. In aspects, the user equipment 102 receives a PDCCH message from the base station 104 via the wireless link 106.

At 310, the user device decodes the PDCCH message based on the UE-specific format indicated in the request message. For example, after performing de-interleaving, de-precoding, symbol combining, symbol demodulation, and descrambling, the user equipment 102 can decode the PDCCH payload without blind decoding because the user device is aware of the UE-specific format used for the PDCCH. Accordingly, the user equipment 102 can use only the relevant format (e.g., the requested UE-specific format)

to decode the PDCCH and therefore reduce excessive power consumption that is typically used when blindly decoding all the PDCCH candidates in every subframe.

At 312, the user device uses the decoded PDCCH message to obtain downlink control information (DCI) usable to access encoded data on a downlink shared channel In an example, the user equipment 102 accesses the DCI in the decoded PDCCH message. The DCI includes information corresponding to resource allocation and transport format of the downlink shared channel, as well as information related to Hybrid Automatic Repeat request (HARQ) on the downlink shared channel.

Figure 4:
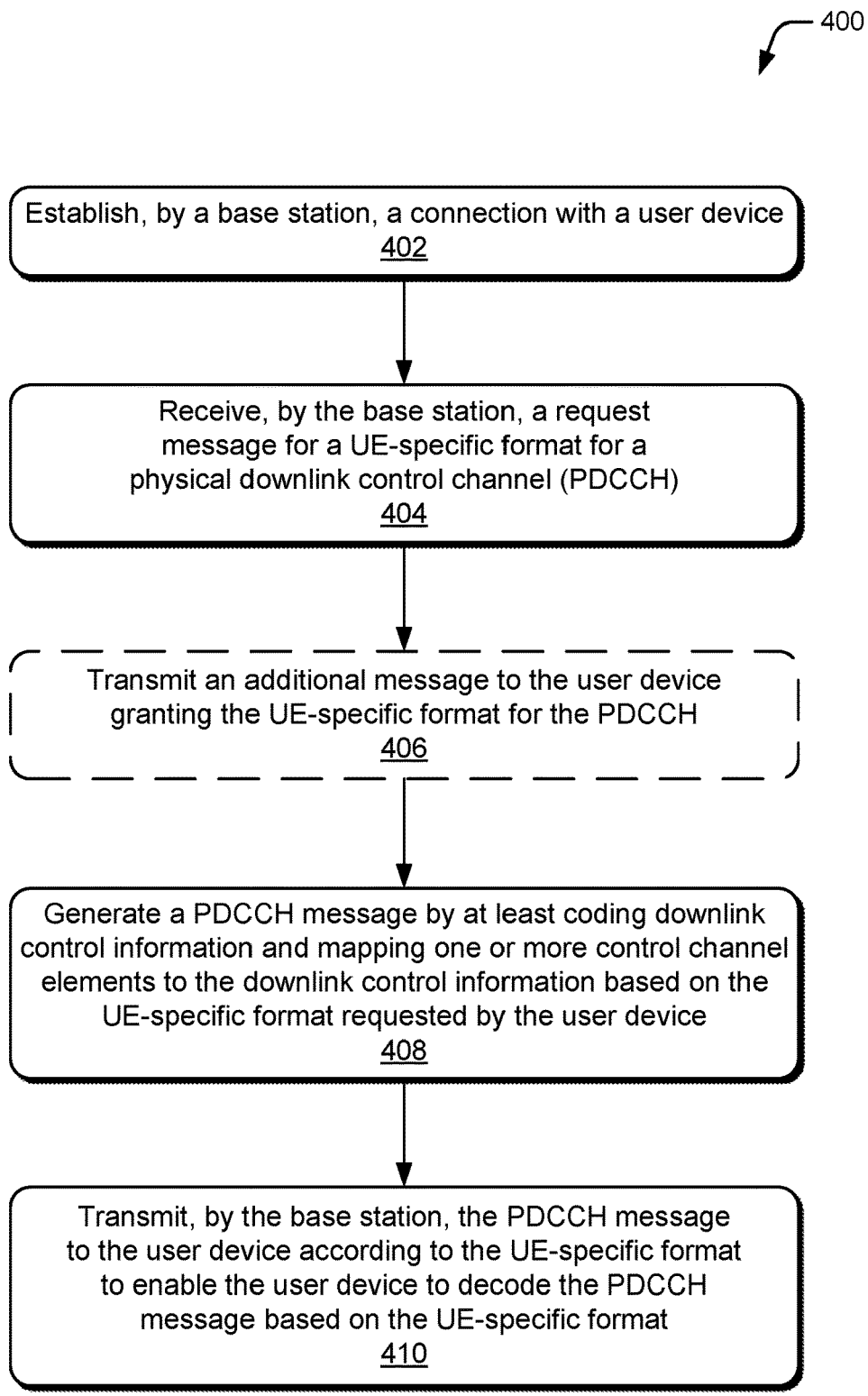
FIG. 4 depicts an example method for communicating, by a base station, with a user device in accordance with aspects of the techniques described herein.

FIG. 4 depicts an example method 400 for communicating, by a base station, with a user device in accordance with aspects of the techniques described herein. The order in which the method blocks are described are not intended to be construed as a limitation, and any number of the described method blocks can be combined in any order to implement a method, or an alternate method.

At 402, a connection is established by the base station with a user device. For example, the base station 104 can establish a connection with the user device via the wireless link 106. Establishing a connection may include a processor (e.g., the processor 226) executing code or instructions stored in a computer-readable storage media 228 (e.g., executing the base station manager 232 code and the device data 230 code stored in the CRM 228).

At block 404, a request message is received, by the base station, for a UE-specific format for a physical downlink control channel (PDCCH). For example, the base station 104 may receive the request message from the user equipment 102 via the wireless link 106. The request message may be received via any suitable uplink signal or control channel of the wireless link or wireless connection. In an example, the request message is received via an uplink RRC message, a MAC CE, a SUL, or an LTE uplink.

Optionally, at 406, the base station transmits an additional message to the user device granting the UE-specific format for the PDCCH. For example, the base station 104 can transmit a downlink RRC message or MAC CE indicating to the user equipment 102 that the requested UE-specific format has been granted and the user equipment 102 should use the UE-specific format to decode an upcoming PDCCH message.

At 408, a PDCCH message is generated by at least coding downlink control information (DCI) and mapping one or more control channel elements (CCEs) to the DCI based on the UE-specific format requested by the user device. For example, the base station 104 can form a PDCCH payload by channel coding the DCI, which includes adding a Cyclical Redundancy Check (CRC) attachment followed by convolution coding and rate matching according to PDCCH format capacity. The coded DCI bits (e.g., the PDCCH payload) are then mapped to CCEs according to the PDCCH format. After performing operations including scrambling, Quadrature Phase Shift Keying (QPSK) modulation, layer mapping, and precoding, the coded DCI bits are converted to complex modulated symbols, which are then interleaved and mapped to physical Resource Elements.

At 410, the base station transmits the PDCCH message to the user device according to the UE-specific format to enable the user device to decode the PDCCH message based on the UE-specific format.

Example Device

Figure 5:
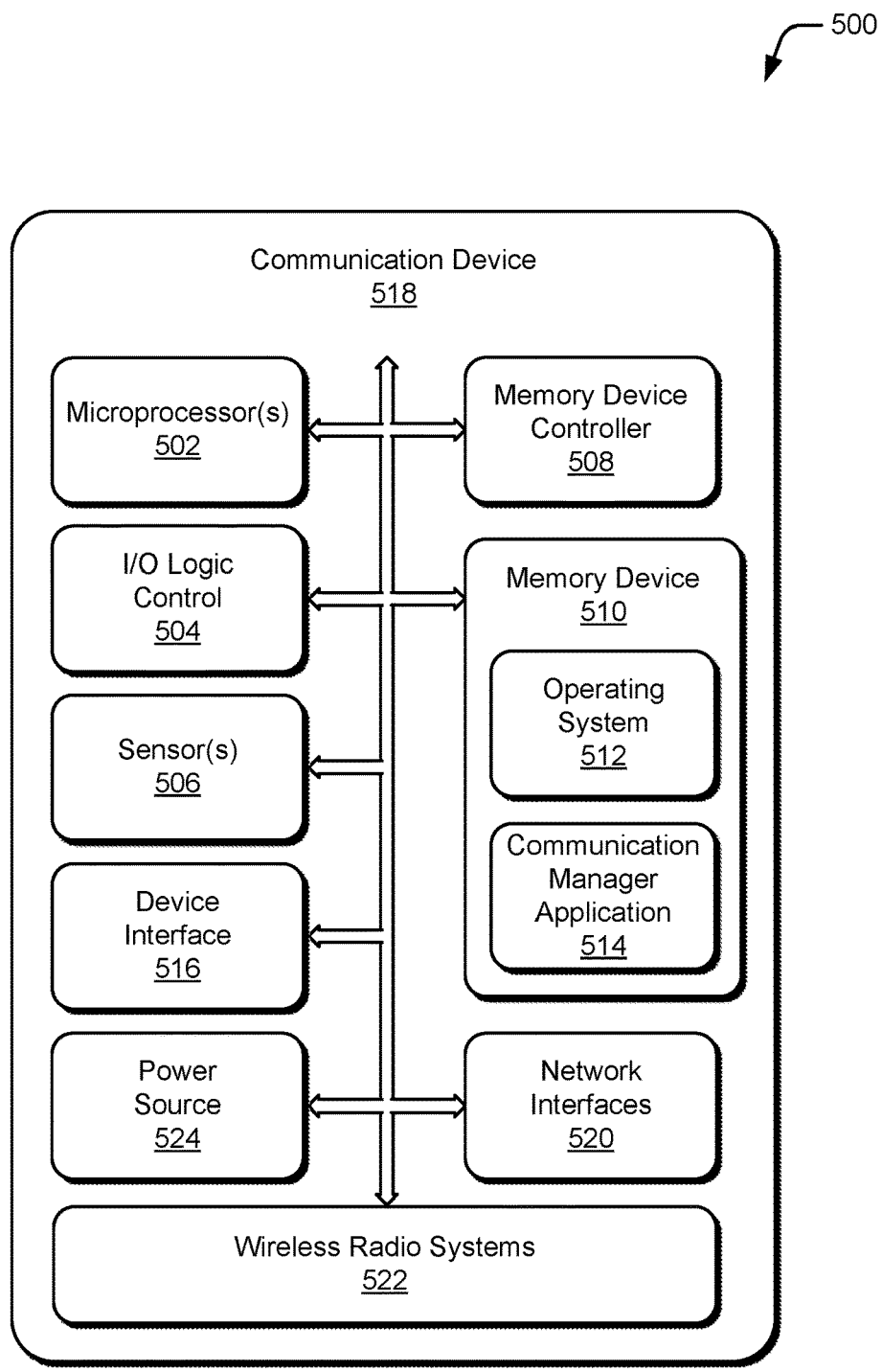
FIG. 5 illustrates an example communication device that can be implemented as the user equipment in accordance with one or more aspects of 5G NR enhanced PDCCH as described herein.

FIG. 5 illustrates an example communication device 500 that can be implemented as the user equipment 102 in accordance with one or more aspects of a 5G NR enhanced PDCCH as described herein. The example communication device 500 may be any type of mobile communication device, computing device, client device, mobile phone, tablet, communication, entertainment, gaming, media playback, and/or other type of device.

The communication device 500 can be integrated with electronic circuitry, microprocessors, memory, input output (I/O) logic control, communication interfaces and components, as well as other hardware, firmware, and/or software to implement the device. Further, the communication device 500 can be implemented with various components, such as with any number and combination of different components as further described with reference to the user equipment 102 shown in FIGS. 1 and 2.

In this example, the communication device 500 includes one or more microprocessors 502 (e.g., microcontrollers or digital signal processors) that process executable instructions. The device also includes an input-output (I/O) logic control 504 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits.

The one or more sensors 506 can be implemented to detect various properties such as acceleration, temperature, humidity, supplied power, proximity, external motion, device motion, sound signals, ultrasound signals, light signals, global-positioning-satellite (GPS) signals, radio frequency (RF), other electromagnetic signals or fields, or the like. As such, the sensors 506 may include any one or a combination of temperature sensors, humidity sensors, accelerometers, microphones, optical sensors up to and including cameras (e.g., charged coupled-device or video cameras), active or passive radiation sensors, GPS receivers, and radio frequency identification detectors.

The communication device 500 includes a memory device controller 508 and a memory device 510 (e.g., the computer-readable storage media 212), such as any type of a nonvolatile memory and/or other suitable electronic data storage device. The communication device 500 can also include various firmware and/or software, such as an operating system 512 that is maintained as computer-executable instructions by the memory and executed by a microprocessor. The device software may also include a communication manager application 514, such as an instance of the communication manager 216, for implementing aspects of a 5G NR enhanced PDCCH. The computer-readable storage media described herein excludes propagating signals or carrier waves.

The communication device 500 also includes a device interface 516 to interface with another device or peripheral component. In addition, the communication device 500 includes an integrated data bus 518 that couples the various components of the communication device 500 for data communication between the components. The data bus in the mesh network device may also be implemented as any one or a combination of different bus structures and/or bus architectures.

The device interface 516 may receive input from a user and/or provide information to the user (e.g., as a user interface), and a received input can be used to determine a setting in accordance with one or more aspects. The device interface 516 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 516 may also receive inputs from any number of peripherals, such as buttons, a keypad, a switch, a microphone, and an imager (e.g., a camera device).

The communication device 500 can include network interfaces 520, such as a wired and/or wireless interface for communication with other devices via Wireless Local Area Networks (WLANs), wireless Personal Area Networks (PANs), and for network communication, such as via the Internet. The network interfaces 520 may include Wi-Fi, Bluetooth™, BLE, and/or IEEE 502.18.4. The communication device 500 also includes wireless radio systems 522 for wireless communication with cellular and/or mobile broadband networks. Each of the different radio systems can include a radio device, antenna, and chipset that is implemented for a particular wireless communications technology, such as the antennas 202, the RF front end 204, the LTE transceiver 206, and/or the 5G NR transceiver 208. The communication device 500 also includes a power source 524, such as a battery and/or to connect the device to line voltage. An alternating current (AC) power source may also be used to charge the battery of the device.

Although aspects of a 5G NR enhanced PDCCH have been described in language particular to features and/or methods, the subject of the appended claims is not necessarily limited to the particular features or methods described. Rather, the particular features and methods are disclosed as example implementations of a 5G NR enhanced PDCCH, and other equivalent features and methods are intended to be within the scope of the appended claims. Further, various different aspects are described, and it is to be appreciated that each described aspect can be implemented independently or in connection with one or more other described aspects.

What is claimed is:

1. A method for communicating, by a user device, with a base station, the method comprising:
   establishing, by the user device, a connection with the base station;
   transmitting, by the user device and to a base station, a request that indicates a requested user equipment (UE)-specific format for a physical downlink control channel (PDCCH);
   receiving, by the user device and on the PDCCH, a PDCCH message from the base station according to the requested UE-specific format used for the PDCCH;
   decoding the PDCCH message based on the requested UE-specific format indicated in the request; and
   using the decoded PDCCH message to obtain downlink control information.

2. The method as recited in claim 1, wherein transmitting the request includes transmitting one or more of an uplink Radio Resource Control (RRC) message or a Medium Access Control (MAC) Control Element (CE).

3. The method as recited in claim 1, further comprising receiving a response from the base station granting the requested UE-specific format for the PDCCH, the response including a downlink Radio Resource Control (RRC) message or a Medium Access Control (MAC) Control Element (CE).

4. The method as recited in claim 1, wherein the request includes a request for at least one of a particular demodulation reference signal (DMRS) density, a modulation order, or an aggregation level, and the PDCCH message received from the base station uses the DMRS density, the modulation order, or the aggregation level, respectively.

5. The method as recited in claim 1, wherein the request includes a particular orthogonal frequency division multiplexing (OFDM) symbol index within a subframe that is used to carry the PDCCH, and the PDCCH message received from the base station is carried in the subframe corresponding to the particular OFDM symbol index.

6. The method as recited in claim 1, wherein the request includes a preference for a frequency bandwidth for the PDCCH, and the PDCCH message received from the base station uses the frequency bandwidth.

7. The method as recited in claim 1, wherein the request includes a request for particular cross-carrier scheduling mapping, and the PDCCH message received from the base station uses the requested cross-carrier scheduling mapping.

8. The method as recited in claim 1, the request includes a request for PDCCH presence in only a particular radio access technology, and the PDCCH message received from the base station corresponds to only the particular radio access technology.

9. The method as recited in claim 1, wherein transmitting the request includes transmitting the request via a scheduled uplink or a long-term evolution (LTE) uplink.

10. The method as recited in claim 1, wherein the request includes a request for PDCCH presence in a UE-defined subset of activated carriers, and the PDCCH message received from the base station uses the UE-defined subset of activated carriers.

11. A method for communicating, by a base station, with a user device, the method comprising:
   receiving, by the base station, a request from the user device that indicates a requested UE-specific format for a physical downlink control channel (PDCCH);
   generating a PDCCH message by at least coding downlink control information and mapping one or more control channel elements to the downlink control information based on the requested UE-specific format; and
   transmitting, by the base station, the PDCCH message to the user device using the requested UE-specific format for the PDCCH.

12. The method as recited in claim 11, wherein the request includes one or more of an uplink Radio Resource Control (RRC) messages or a Medium Access Control (MAC) Control Element (CE).

13. The method as recited in claim 11, wherein the PDCCH message uses at least one of a demodulation reference signal (DMRS) density, a modulation order, or an aggregation level that is set in accordance with information provided in the request.

14. The method as recited in claim 11, wherein the PDCCH message uses a particular orthogonal frequency division multiplexing (OFDM) symbol index within a subframe that is used to carry the PDCCH, based on the request including a request for the particular OFDM symbol index.

15. The method as recited in claim 11, wherein the PDCCH message uses a particular frequency bandwidth for the PDCCH based on a preference indicated in the request.

16. The method as recited in claim 11, wherein the PDCCH message uses a particular cross-carrier scheduling mapping based on information provided in the request.

17. The method as recited in claim 11, the PDCCH message uses only a particular radio access technology based on the request indicating the particular radio access technology.

18. A mobile communication device comprising:
a radio frequency transceiver; and
a processor and memory system to implement a communication manager application configured to:
  establish a connection with a base station;
  transmit, via the radio frequency transceiver and to the base station, a request that indicates a requested user equipment (UE)-specific format for a physical downlink control channel (PDCCH);
  receive a confirmation message from the base station granting the requested UE specific format for the PDCCH;
  receive a PDCCH message from the base station using the requested UE-specific format for the PDCCH; and
  decode the PDCCH message based on the requested UE-specific format.

19. A mobile communication device as recited in claim 18, wherein the processor and memory system implement the communication manager application to:
  transmit the request via one or more Radio Resource Control (RRC) messages or one or more Medium Access Control (MAC) Control Elements (CEs), and
  receive the confirmation message via one or more additional RRC messages or one or more additional MAC CEs.

20. A mobile communication device as recited in claim 18, wherein the request indicates a preference for at least one of a particular demodulation reference signal (DMRS) density, a modulation order, or an aggregation level, and the PDCCH message uses the particular DMRS density, the modulation order, or that aggregation level, respectively.

* * * * *